United States Patent
Huang et al.

(10) Patent No.: US 8,436,819 B2
(45) Date of Patent: May 7, 2013

(54) FLEXIBLE TOUCH DISPLAY APPARATUS

(75) Inventors: Wan-Ting Huang, Hsin-Chu (TW);
Chun-Hsiang Fang, Hsin-Chu (TW);
Chung-Chun Lee, Hsin-Chu (TW)

(73) Assignee: Au Optronics Corp., Hsin-Chu (TW)

( * ) Notice: Subject to any disclaimer, the term of this patent is extended or adjusted under 35 U.S.C. 154(b) by 643 days.

(21) Appl. No.: 12/609,812

(22) Filed: Oct. 30, 2009

(65) Prior Publication Data
US 2010/0315353 A1 Dec. 16, 2010

(30) Foreign Application Priority Data
Jun. 12, 2009 (TW) .............................. 98119689 A

(51) Int. Cl.
*G06F 3/041* (2006.01)
*G09G 3/38* (2006.01)

(52) U.S. Cl.
USPC .......................................................... 345/173

(58) Field of Classification Search ................... 345/173
See application file for complete search history.

(56) References Cited

U.S. PATENT DOCUMENTS

| | | | |
|---|---|---|---|
| 6,197,418 B1 * | 3/2001 | Cloots et al. ................. | 428/332 |
| 8,125,347 B2 * | 2/2012 | Fahn ............................ | 340/815.4 |
| 2003/0224205 A1 * | 12/2003 | Li et al. ........................ | 428/690 |
| 2004/0124765 A1 * | 7/2004 | Iwase ........................... | 313/504 |
| 2004/0175580 A1 * | 9/2004 | Schaepkens .................. | 428/446 |
| 2004/0212599 A1 | 10/2004 | Cok et al. | |
| 2005/0095422 A1 * | 5/2005 | Sager et al. .................. | 428/336 |
| 2006/0103916 A1 * | 5/2006 | Kawai ........................... | 359/296 |
| 2006/0132461 A1 * | 6/2006 | Furukawa et al. ........... | 345/173 |
| 2006/0187213 A1 | 8/2006 | Su | |
| 2007/0160777 A1 * | 7/2007 | Iwase ............................ | 428/1.1 |
| 2007/0247437 A1 * | 10/2007 | Ku et al. ....................... | 345/173 |
| 2009/0021678 A1 * | 1/2009 | Son et al. ..................... | 349/122 |
| 2009/0078938 A1 * | 3/2009 | Yamazaki ..................... | 257/59 |
| 2010/0149145 A1 | 6/2010 | Van Woudenberg et al. | |
| 2010/0265207 A1 * | 10/2010 | Chen ............................ | 345/174 |
| 2010/0295812 A1 * | 11/2010 | Burns et al. ................. | 345/174 |

FOREIGN PATENT DOCUMENTS

| | | |
|---|---|---|
| CN | 101223494 A | 7/2008 |
| JP | 05-135654 | 6/1993 |
| JP | 2003-296032 | 10/2003 |
| TW | 200638791 | 9/2006 |
| TW | 200705347 | 2/2007 |
| WO | WO 2007/012899 * | 2/2007 |

* cited by examiner

*Primary Examiner* — Alexander S Beck
*Assistant Examiner* — Mihir Rayan
(74) *Attorney, Agent, or Firm* — WPAT, PC; Justin King

(57) ABSTRACT

A flexible touch display apparatus includes a flexible substrate, a display unit, a flexible insulation layer and a touch sensor layer. The display unit is disposed on the flexible substrate, the flexible insulation layer is disposed on the display unit, and the touch sensor layer is formed on the flexible insulation layer. The flexible touch display apparatus is light in weight, thin in thickness, flexible and unbreakable.

10 Claims, 2 Drawing Sheets

FLEXIBLE TOUCH DISPLAY APPARATUS

CROSS-REFERENCE TO RELATED APPLICATIONS

This application is based upon and claims the benefit of priority from the prior Taiwanese Patent Application No. 098119689, filed Jun. 12, 2009, the entire contents of which are incorporated herein by reference.

BACKGROUND

1. Field of the Invention

The present invention relates to a display apparatus and particularly to a flexible touch display apparatus.

2. Description of the Related Art

In recent years, due to touch panel apparatuses having an advantage of easy operation, the touch display apparatuses have been widely applied to various types of electronic products, and especially to portable electronic products such as notebook computers, personal digital assistants, mobile phones, satellite navigation devices and electronic paper devices, etc.

The touch panel apparatuses are classified into two types, that is, the on-cell touch panel apparatus and the in-cell touch panel apparatus. The conventional on-cell touch panel is used in combination with conventional soft displays such as liquid crystal displays (LCDs), organic light emitting diode (OLED), plasma displays and electroluminescent display. The touch screens are respectively manufactured as separate devices and matched to the surface of the displays. However, the separation between the touch screen and display increase thickness, manufacturing cost and decrease performance as compared to more integrated solutions.

A in-cell touch panel apparatus is a touch sensor layer formed into part layer of rigid substrate of a display apparatus. Comparing to the conventional on-cell touch panel apparatus, in the conventional in-cell touch panel apparatus, due to the touch sensor layer being integrated into the rigid substrate of the displays, another substrate is not needed in the touch screen. Therefore, a thickness and a weight of the conventional in-cell touch display apparatus are reduced. However, in the conventional in-cell touch panel apparatus, due to the touch sensor layer being formed on the rigid substrate and the rigid substrate having thicker thickness, the thickness and the weight of the conventional in-cell touch panel apparatus can not be greatly reduced. Moreover, the conventional in-cell touch panel apparatus includes the rigid substrate, so that in-cell touch panel can not achieve the advantages of the flexible display apparatus. Thus, there remains a need for improved touch panel, display system that minimize device weight, decrease cost, eliminates mechanical mounting designs, increase reliability and achieve to flexibility and unbreakable feature for widely free shape touch display application.

BRIEF SUMMARY

The present invention provides a flexible touch display apparatus to achieve advantages of light weight, thin thickness, flexibility and unbreakable feature.

To achieve the abovementioned advantages, the present invention provides a flexible touch display apparatus including a flexible substrate, a display unit, a flexible insulation layer and a touch sensor layer. The display unit is disposed on the flexible substrate, the flexible insulation layer is disposed on the display unit, and the touch sensor layer is formed on the flexible insulation layer.

In an embodiment of the present invention, the display unit is an organic light emitting diode (OLED) display unit.

In an embodiment of the present invention, the flexible touch display apparatus further includes an adhesive layer disposed between the flexible insulation layer and the display unit. Material of the adhesive layer can be pressure sensitive adhesive. Moreover, the flexible touch display apparatus can further include a barrier layer disposed between the flexible insulation layer and the adhesive layer. The barrier layer can include at least one organic thin film and at least one inorganic thin film, wherein the at least one organic thin film and the at least one inorganic thin film are alternatively stacked. Furthermore, material of the organic thin film can be selected from the group consisting of polyethylene terephthalate (PET), polyethylene naphthalate (PEN) and a combination thereof. Material of the inorganic thin film can be selected from the group consisting of silicon dioxide, silicon nitride, aluminium oxide and a combination thereof.

In an embodiment of the present invention, the display unit includes a first electrode layer, an electrophoretic layer and a second electrode layer. The first electrode layer is formed on the flexible substrate, the electrophoretic layer is disposed on the first electrode layer, and the second electrode layer is disposed on the electrophoretic layer. The second electrode layer is a transparent electrode layer.

In an embodiment of the present invention, material of the flexible substrate can be plastic or metal.

In an embodiment of the present invention, material of the flexible substrate is glass, and thickness of the flexible substrate is smaller than 100 micrometers.

In an embodiment of the present invention, material of the flexible insulation layer includes plastic.

In an embodiment of the present invention, material of the flexible insulation layer is selected from the group consisting of PET, PEN, polyimide (PI) and a combination thereof.

In an embodiment of the present invention, the touch sensor layer is a resistive type touch sensor layer, a capacitance touch sensor layer, or an optical type touch sensor layer.

In the flexible touch display apparatus of the present invention, the touch sensor layer is formed on the flexible insulation layer which is adapted to protect the display unit, so another substrate for carrying the touch sensor layer can be omitted. Therefore, thickness and weight of the flexible touch display apparatus of the present invention can be reduced. Further, the flexible substrate and the flexible insulation layer are used in the flexible touch display apparatus of the present invention, so the flexible touch display apparatus of the present invention can achieve advantages of light weight, thin thickness, flexibility and unbreakable feature.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
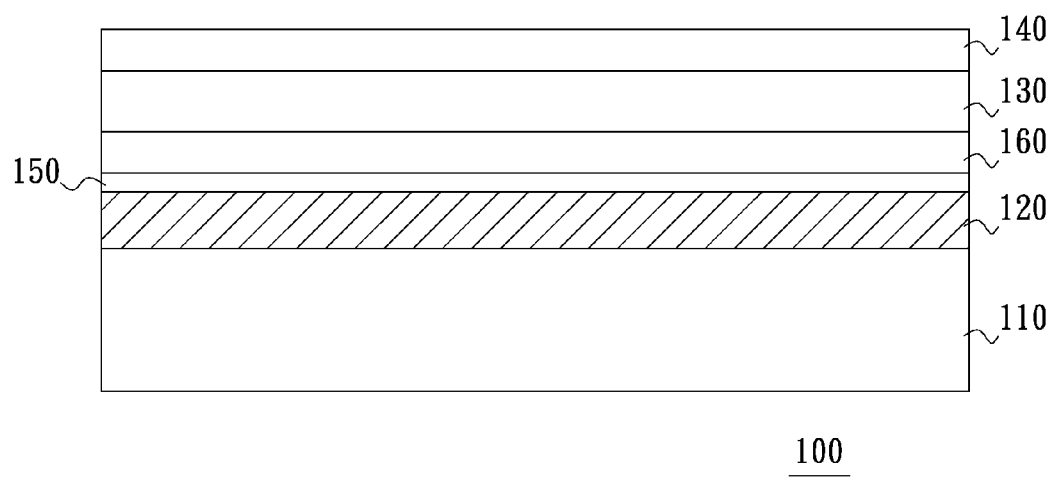
FIG. 1 is a schematic view of a flexible touch display apparatus according to a first embodiment of the present invention.

FIG. 1 is a schematic view of a flexible touch display apparatus according to a first embodiment of the present invention. Referring to FIG. 1, the flexible touch display apparatus 100 of the present embodiment includes a flexible substrate 110, a display unit 120, a flexible insulation layer 130 and a touch sensor layer 140. The display unit 120 is disposed on the flexible substrate 110, the flexible insulation layer 130 is disposed on the display unit 120, and the touch sensor layer 140 is formed on the flexible insulation layer 130. In other words, the touch sensor layer 140 is directly manufactured on the flexible insulation layer 130 rather than on another substrate.

Material of the flexible substrate 110 can be plastic, metal or other suitable flexible material. The flexible substrate 110 also can be a glass whose thickness is smaller than 100 micrometers. Moreover, the flexible insulation layer 130 can protect the display unit 120, so as to prevent the display unit 120 from being damaged by vapor or other air. In the present embodiment, material of the flexible insulation layer 130 can be plastic. More specifically, the material of the flexible insulation layer 130 can be selected from the group consisting of PET, PEN, PI and a combination thereof. Furthermore, the display unit 120 of the present embodiment can be, but not limited to, an OLED display. The touch sensor layer 140 can be, but not limited to, a resistive type touch sensor, layer a capacitance type touch sensor layer or an optical type touch sensor layer.

The flexible touch display apparatus 100 of the present embodiment can further include an adhesive layer 150 disposed between the flexible insulation layer 130 and the display unit 120. Thus, the flexible insulation layer 130 can be attached to the display unit 120 through the adhesive layer 150. Material of the adhesive layer 150 can be pressure sensitive adhesive or other suitable adhesive material.

Comparing to the conventional on-cell touch panel apparatus, the touch sensor layer 140 of the present embodiment is directed manufactured on the flexible insulation layer 130 which is adapted to protect the display unit 120, so another substrate for carrying the touch panel can be omitted. Thus, not only thickness and weight of the flexible touch display apparatus 100 of the present embodiment can be reduced, but also a cost of the substrate can be saved. Further, the touch sensor layer 140 of the present embodiment is formed on the flexible insulation layer 130 rather than on a rigid substrate with heavier weight and thicker thickness. Thus, comparing to the conventional in-cell touch panel apparatus, the flexible touch display apparatus 100 of the present embodiment still has the advantages of light weight and thin thickness. Moreover, in the flexible touch display apparatus 100 of the present embodiment, the flexible substrate 110 for carrying the display unit 120 and the flexible insulation layer 130 for carrying the touch sensor layer 140 are flexible, so the flexible touch display apparatus 100 of the present embodiment can achieve the advantages of flexible display apparatus such as light weight, thin thickness, flexibility and unbreakable feature, etc.

It should be noted that a barrier layer 160 can be disposed between the flexible insulation layer 130 and the adhesive layer 150 to further prevent the display unit 120 from being damaged by vapor and other air. The barrier layer 160 can be, but not limited to, formed by vacuum coating, spreading or printing. The barrier layer 160 can includes at least one organic thin film (not shown in FIG. 1) and at least one inorganic thin film (not shown in FIG. 1), wherein the at least one organic thin film and the at least one inorganic thin film are alternatively stacked. The film nearest to the display unit 120 is, for example, the inorganic thin film, and the film nearest to the flexible insulation layer 130 is, for example, the organic thin film. Furthermore, material of the organic thin film can be selected from the group consisting of PET, PEN and a combination thereof. Material of the inorganic thin film can be selected from the group consisting of silicon dioxide, silicon nitride, aluminium oxide and a combination thereof.

Figure 2:
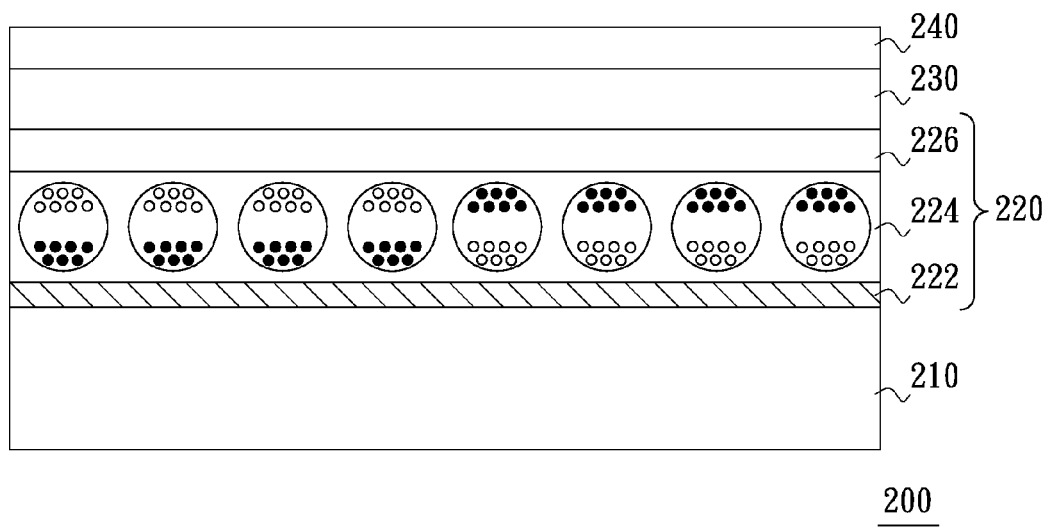
FIG. 2 is a schematic view of a flexible touch display apparatus according to a second embodiment of the present invention.

FIG. 2 is a schematic view of a flexible touch display apparatus according to a second embodiment of the present invention. Referring to FIG. 2, the flexible touch display apparatus 200 of the present embodiment includes a flexible substrate 210, a display unit 220, a flexible insulation layer 230 and a touch sensor layer 240. The display unit 220 is disposed on the flexible substrate 210, the flexible insulation layer 230 is disposed on the display unit 220, and the touch sensor layer 240 is formed on the flexible insulation layer 230.

Since the flexible substrate 210, the flexible insulation layer 230 and the touch sensor layer 240 are similar to the flexible substrate 110, the flexible insulation layer 130 and the touch sensor layer 140 of the first embodiment, detail description will be omitted. Moreover, the display unit 220 of the present embodiment includes, for example, a first electrode layer 222, an electrophoretic layer 224 and a second electrode layer 226. The first electrode layer 222 is formed on the flexible substrate 210. That means that the first electrode layer 222 is directly manufactured on the flexible substrate 210. The electrophoretic layer 224 is disposed on the first electrode layer 222, and the second electrode layer 226 is disposed on the electrophoretic layer 224. The second electrode layer 226 is a transparent electrode layer, and material of the second electrode layer 226 can be indium tin oxide (ITO), indium zinc oxide (IZO) or other suitable transparent material. Although the electrophoretic layer 224 shown in FIG. 2 is a microcapsule electrophoretic layer, the electrophoretic layer 224 can be other type of electrophoretic layer (e.g. a microcup electrophoretic layer).

Advantages of the flexible touch display apparatus 200 of the present embodiment are similar to that of the flexible touch display apparatus 100 of the first embodiment, and detail description will be omitted.

In summary, the flexible touch display apparatus of the present invention has at least the following advantages:

1. Comparing to the conventional on-cell touch display apparatus, in the present invention, the touch sensor layer is directly formed on the flexible insulation layer which is adapted to protect the display unit, so another substrate for carrying the touch sensor layer can be omitted. Thus, thickness, weight and cost of the flexible touch display apparatus of the present invention can be reduced.

2. Comparing to the conventional in-cell touch display apparatus, in the present invention, the touch sensor layer is formed on the flexible insulation layer rather than on the rigid substrate and the display unit is formed on flexible substrate, so the flexible touch display apparatus of the present invention can achieve the advantages of light weight, thin thickness, flexibility and unbreakable feature.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A flexible touch display apparatus, comprising:
a flexible substrate;
a display unit disposed on the flexible substrate;
a flexible insulation layer disposed on the display unit;
a touch sensor layer formed on and contacted the flexible insulation layer;
an adhesive layer, in direct contact with the display unit, disposed between the flexible insulation layer and the display unit; and
a barrier layer disposed between the flexible insulation layer and the adhesive layer;
wherein the adhesive layer is contacted the barrier layer and the display unit; and
wherein the flexible substrate is disposed opposite the adhesive layer, in direct contact with the display unit.

2. The flexible touch display apparatus as claimed in claim 1, wherein the display unit is an organic light emitting diode display unit.

3. The flexible touch display apparatus as claimed in claim 1, wherein material of the adhesive layer is pressure sensitive adhesive.

4. The flexible touch display apparatus as claimed in claim 1, wherein the barrier layer comprises at least one organic thin film and at least one inorganic thin film stacked alternately.

5. The flexible touch display apparatus as claimed in claim 4, wherein material of the organic thin film is selected from the group consisting of polyethylene terephthalate, polyethylene naphthalate and a combination thereof, and material of the inorganic thin film is selected from the group consisting of silicon dioxide, silicon nitride, aluminum oxide and a combination thereof.

6. The flexible touch display apparatus as claimed in claim 1, wherein material of the flexible substrate is plastic or metal.

7. The flexible touch display apparatus as claimed in claim 1, wherein material of the flexible substrate is glass and thickness of the flexible substrate is smaller than 100 micrometers.

8. The flexible touch display apparatus as claimed in claim 1, wherein material of the flexible insulation layer comprises plastic.

9. The flexible touch display apparatus as claimed in claim 8, wherein material of the flexible insulation layer is selected from the group consisting of polyethylene terephthalate, polyethylene naphthalate, polyimide and a combination thereof.

10. The flexible touch display apparatus as claimed in claim 1, wherein the touch sensor layer is a resistive type touch sensor layer, a capacitance touch sensor layer, or an optical type touch sensor layer.

* * * * *